(12) United States Patent
Forsthovel

(10) Patent No.: US 8,795,575 B2
(45) Date of Patent: Aug. 5, 2014

(54) METHOD FOR PRODUCING PLASTIC CONTAINERS AND/OR PLASTIC PREFORMS

(75) Inventor: Jochen Forsthovel, Regensburg (DE)

(73) Assignee: Krones AG, Neutraubling (DE)

( * ) Notice: Subject to any disclaimer, the term of this patent is extended or adjusted under 35 U.S.C. 154(b) by 321 days.

(21) Appl. No.: 13/281,772

(22) Filed: Oct. 26, 2011

(65) Prior Publication Data

US 2012/0098159 A1  Apr. 26, 2012

(30) Foreign Application Priority Data

Oct. 26, 2010 (DE) .......................... 10 2010 042 965

(51) Int. Cl.
*B29C 45/72* (2006.01)

(52) U.S. Cl.
USPC ...................................... 264/328.14; 425/547

(58) Field of Classification Search
CPC B29B 13/021; B29B 13/065; B29C 45/0084; B29C 45/17; B29K 2105/26; F26B 23/001
USPC ...................................... 264/328.14; 425/547
See application file for complete search history.

(56) References Cited

U.S. PATENT DOCUMENTS 5,440,005 A  8/1995  Pikus

FOREIGN PATENT DOCUMENTS

| AT | 506489 | 9/2009 |
| EP | 1789469 A1 | 5/2007 |
| JP | 2000280288 A | 10/2000 |
| WO | WO-03045542 A1 | 6/2003 |
| WO | WO-2004080691 A1 | 9/2004 |
| WO | WO-2005028531 A2 | 3/2005 |
| WO | WO-2005092591 A2 | 10/2005 |
| WO | WO-2006021118 A1 | 3/2006 |
| WO | WO-2007065184 A1 | 6/2007 |
| WO | WO-2007116022 A2 | 10/2007 |

OTHER PUBLICATIONS

European search report for 11174139.3, dated Jan. 11, 2012.
"Preforms/PET-bottles", Oct. 7, 2010, Seiten 1-5, XP002666473, Gefunden im Internet: URL:http://www.motan-colortronic.com/en/solutions/injection-moulding/preformspet-bottles.html, Dec. 28, 2011.
"Viscotec-Food grade PCR PET", Oct. 6, 2010, pp. 1-4, XP002666474, URL:http://www.viscotec.at/assets/Uploads/Dokumente/ViscotecPETFolderG2X1a.pdf, Dec. 28, 2011.
"Viscotec-Solid State Polycondensation Plant", Aug. 2010, pp. 1-2, XP002666475, URL:http://www.viscotec.at/assets/Uploads/Dokumente/viscoSTAR.pdf, Dec. 28, 2011.
"Viscotec-Decontamination Dryer", Aug. 2010, pp. 1-2, XP002666476, URL:http://www.viscotec.at/assets/Uploads/Dokumente/deCON.pdf, Dec. 28, 2011.
Müller, K.; Welle, F.: "PET in der Getränkeverpackung", Kunststoffe, [Online] Oct. 2005, pp. 120-125, XP002666477, URL:http://www.kunststoffe.de/directlink.asp?KU103367>, Dec. 28, 2011.
Search Report for DE 10 2010 042 965.1 mailed Jul. 29, 2011.

*Primary Examiner* — Jill Heitbrink
(74) *Attorney, Agent, or Firm* — Marshall, Gerstein & Borun LLP

(57) ABSTRACT

A method for producing plastic containers and/or plastic preforms by means of an injection molding machine, including providing plastic recyclate and new plastic material, heating the plastic recyclate, and heating the new plastic material using at least a part of the heat contained in the heated plastic recyclate.

15 Claims, 2 Drawing Sheets

METHOD FOR PRODUCING PLASTIC CONTAINERS AND/OR PLASTIC PREFORMS

CROSS-REFERENCE TO RELATED APPLICATION

The present application claims the benefit of priority of German Application No. 102010042965.1, filed Oct. 26, 2010. The entire text of the priority application is incorporated herein by reference in its entirety.

FIELD OF THE DISCLOSURE

The disclosure relates to a method for producing plastic containers and/or plastic preforms by means of an injection molding machine.

BACKGROUND

Plastic containers, for example, plastic bottles, are often used as containers for fluid products, such as beverages. The production of plastic containers can happen directly in an injection molding machine using a thermoplastic plastic material. Another known method for producing plastic containers comprises first a production of plastic preforms in an injection molding machine. These plastic preforms are then being formed to the desired plastic containers in a blow molding machine. For that purpose, the plastic preforms are being thermally conditioned and then formed to containers in so-called blow molds by being exposed to pressurized air.

For the production of the containers and/or of the preforms in the injection molding machine, often not only new plastic granulate is used, but also recycled plastic material, so-called plastic recyclate. The plastic recyclate can, for example, be obtained from already used plastic containers, which have been supplied for recycling by the consumer. In the process it is required to shred the old containers and to free the thus obtained plastic flakes from pollutions and to decontaminate them.

A disadvantage of the known methods is that in both, the recycling process and the production process, many method steps have to be performed at high temperatures and, thus, require an energy consuming heating of the plastic material.

SUMMARY OF THE DISCLOSURE

It is, thus, one aspect of the present disclosure to provide a more energy efficient method for producing plastic containers and/or plastic preforms.

The method according to the disclosure for producing plastic containers and/or plastic preforms by means of an injection molding machine includes the steps:
  providing plastic recyclate and new plastic material,
  heating the plastic recyclate and
  heating the new plastic material using at least a part of the heat contained in the heated plastic recyclate.

As for the heating of the new plastic material at least a part of the heat contained in the heated plastic recyclate is used, a more energy efficient method for producing plastic containers and/or plastic preforms may be provided. In particular, in this way, heat from the recycling process may be used for heating the new plastic material.

In other words, at least a part of the heat of the heated plastic recyclate may be diverted and supplied to the new plastic material.

The plastic containers to be produced may particularly comprise a thermoplastic plastic, for example, PET (Polyethylene terephthalate).

The plastic container may particularly be a plastic bottle, for example, a PET-bottle. A plastic preform may be designed such that it can be formed to a plastic container, for example, a plastic bottle, in a blow molding process by application of pressurized air in a blow mold. Additional to the application of pressurized air, also a stretch forming of the preform may be performed in the blow mold using a stretching rod.

As plastic recyclate, particularly, a recycled plastic material may be understood herein. In particular, the plastic recyclate may be made of recycled plastic containers, which have been supplied for recycling by consumers. For this purpose, the recycled bottles may be first shredded. Thereby so-called plastic flakes may be formed, i.e. 5 to 20 mm large plastic pieces. These plastic flakes can in succession be freed from contaminants and cleaned.

In other words, the providing of the plastic recyclate may comprise a shredding of recycled plastic containers to plastic flakes.

As new plastic material, particularly, plastic material may be understood herein, which was not obtained in a recycling process from recycled plastic containers. The new plastic material may, for example, be available in form of plastic granulate.

The heating of the plastic recyclate may particularly be part of the recycling method.

The plastic recyclate may be heated to a temperature, which lies above the temperature required for inserting into and/or processing in the injection molding machine, wherein at least a part of the heat lying above the temperature required for inserting into and/or processing in the injection molding machine is used for heating the new plastic material.

The temperature required for inserting into and/or processing in the injection molding machine may be between 140° C. and 180° C., in particular 160° C.

The plastic recyclate may be heated such that the plastic recyclate is decontaminated at least partially via the heating. For that purpose, the plastic recyclate may particularly be heated to temperatures above the temperature required for inserting into and/or processing in the injection molding machine, particularly above 180° C. In other words, the heating of the plastic recyclate may correspond to a decontamination of the plastic recyclate, particularly at temperatures above 180° C.

The heating of the plastic recyclate may also comprise a Solid State Polycondensation (SSP) at temperatures above 180° C., wherein as Solid State Polycondensation also an increasing of the IV-value (intrinsic viscosity) may be understood.

"Decontamination" herein, particularly, may be understood as a removal of impurities and/or undesirable substances from the plastic recyclate. In other words, contaminants shall be removed from the plastic recyclate.

The new plastic material can be heated to a temperature between 140° C. and 180° C., in particular to 160° C. In this way, on the one hand, a drying of the new plastic material can be achieved, on the other hand, the new plastic material can be brought to a temperature required for inserting into and/or processing in the injection molding machine.

The heating of the new plastic material can particularly comprise:
  moving a heat transport means past the heated plastic recyclate for heating the heat transport means and
  moving the heated heat transport means past the new plastic material.

In this way, heat can be transported from the heated plastic recyclate to the new plastic material in a simple way.

The heat transport means can particularly comprise dry air and/or an inert gas or can be dry air and/or an inert gas.

The inert gas can, for example, be or comprise nitrogen and/or a rare gas, for example, Helium.

The heat transport means can be moved past the heated plastic recyclate and/or the new plastic material directly and/or indirectly. In other words, the heat transport means can contact the heated plastic recyclate and/or the new plastic material directly. In this way, a direct heat exchange between the heated plastic recyclate and/or the new plastic material and the heat transport means can be achieved.

Alternatively or additionally, the heat transport means can be moved past the heated plastic recyclate and/or the new plastic material indirectly. In other words, the heat transport means can be moved past the heated plastic recyclate and/or the new plastic material separate from the heated plastic recyclate and/or the new plastic material, for example, in a duct.

In this way, a direct contact between the heated plastic recyclate and/or the new plastic material and the heat transport means may be avoided. In this case, the area in which the heat transport means is moved past the heated plastic recyclate and/or the new plastic material can be separated by a heat conducting or heat permeable wall from the area in which the heated plastic recyclate and/or the new plastic material is arranged.

The heat permeable wall may comprise a heat conducting material, for example a metal, particularly stainless steel. The heat permeable wall can be designed such that the heat transport means can be heated by the heated plastic recyclate and that the new plastic material can be heated by the heated heat transport means, respectively.

The heat transport means can be moved past the heated plastic recyclate and/or the new plastic material in a counter flow. In this way, the relative velocity of the heat transport means to the heated plastic recyclate and/or the new plastic material can be increased and the heat exchange can be improved.

Alternatively or in addition to the use of a heat transport means, the heating of the new plastic material may comprise arranging the heated plastic recyclate and the new plastic material in two containers, which are at least partially connected via a heat permeable wall. In other words, the heated plastic recyclate may be arranged in a first container and the new plastic material may be arranged in a second container, wherein the first and the second container are connected at least partially via a heat permeable wall. In this way, an indirect heat transfer from the heated plastic recyclate to the new plastic material may be achieved.

As a heat permeable or heat conducting wall particularly a container wall, which comprises or consists of a heat conducting material, may be understood herein.

The heat conductivity of the heat permeable wall, particularly of the heat conducting material, can be at least 15 W/(K·m), in particular, at least 40 W/(K·m). According to a preferred embodiment, the heat conductivity may be at least 300 W/(K·m).

The container or reservoir for the new plastic material can be arranged at least partially inside the container or reservoir for the heated plastic recyclate.

In particular, the container for the heated plastic recyclate and/or the container for the new plastic material may be designed each as down pipe, particularly as concentric down pipes. In this case, the arranging of the heated plastic recyclate and the new plastic material in two containers connected via a heat permeable wall may comprise or correspond to inserting the plastic recyclate and/or the new plastic material into the corresponding down pipe.

The inventive method may further comprise producing, particularly injection molding, at least one plastic container and/or at least one plastic preform in the injection molding machine using the heated plastic recyclate and the heated new plastic material. In other words, at least one plastic container and/or at least one plastic preform may be injection molded from the heated plastic recyclate and the heated new plastic material.

The disclosure further provides a device for producing plastic containers and/or plastic preforms, including:

an injection molding machine for injection molding the plastic containers and/or plastic preforms, a heating device for heating plastic recyclate, and a heating device for heating new plastic material, wherein the device is designed and/or configured such that at least a part of the heat contained in the heated plastic recyclate is used for heating the new plastic material.

By such a device it is possible to use heat from the recycling process for heating the new plastic material.

The device can particularly be designed for performing an above described method. The plastic recyclate, the new plastic material, the plastic containers and/or the plastic preforms may particularly exhibit one or more of the above mentioned features.

The device may particularly comprise a device for the transport of a heat transport means, which is configured such that the heat transport means can be moved past the heated plastic recyclate for heating the heat transport means and that the heated heat transport means is moved past the new plastic material. In this way, a heat transport from the heated plastic recyclate to the new plastic material can be achieved.

The device may further comprise a container or reservoir for the heated plastic recyclate and a container or reservoir for the new plastic material, wherein the containers are connected at least partially by a heat permeable wall. The container for the heated plastic recyclate, the container for the new plastic material and/or the heat permeable wall may exhibit one or more of the above mentioned features.

In particular, the container for the new plastic material may be arranged at least partially inside the container for the heated plastic recyclate.

The device may particularly be a block machine comprising a recycling facility and an injection molding machine.

BRIEF DESCRIPTION OF THE DRAWINGS

Further features and advantages of the disclosure will be described hereafter using the exemplary figures. It shows.

DETAILED DESCRIPTION OF THE PREFERRED EMBODIMENT

It is necessary in the plastic recycling process to decontaminate plastic recyclate obtained from used plastic containers or to lengthen molecular chains (Solid State Polycondensation, SSP) both at high temperatures, particularly at more than 180° C. These temperatures are usually above the level required for inserting into the injection molding machine or processing in the injection molding machine.

Figure 1:
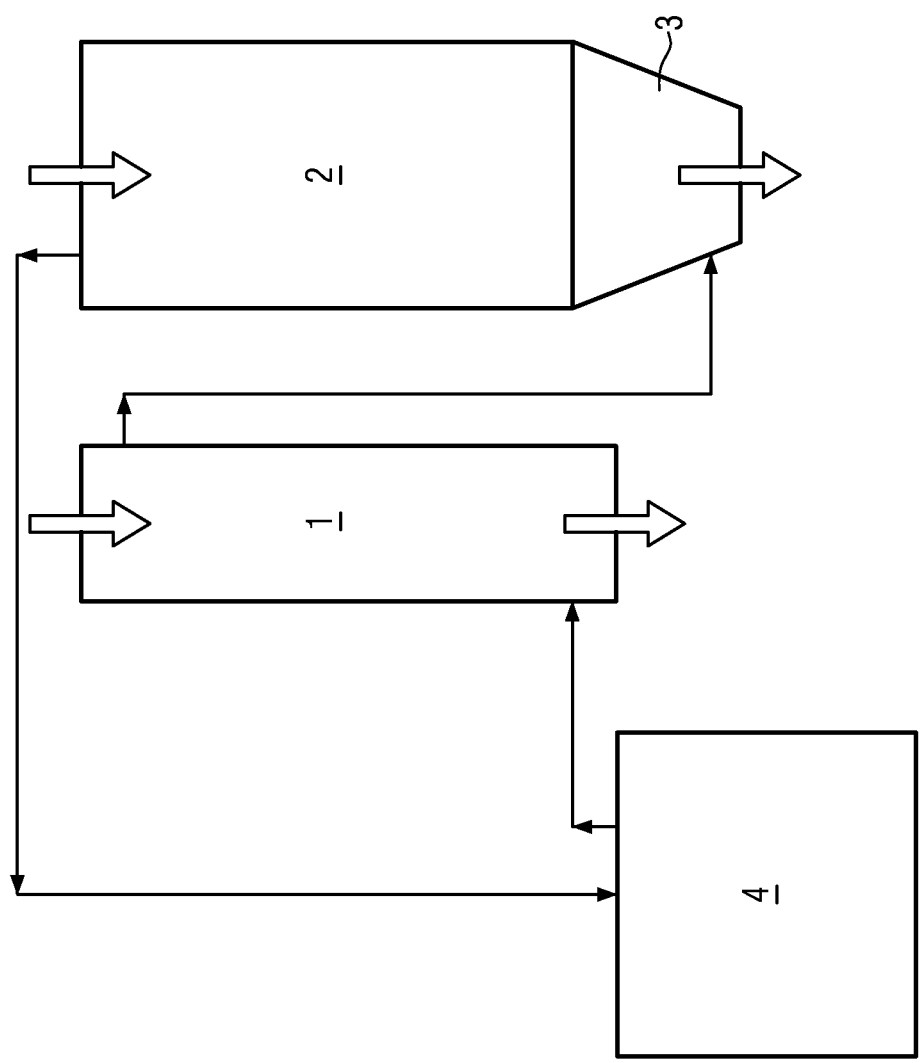
FIG. 1 an illustration of an exemplary method for producing plastic containers and/or plastic preforms.

FIG. 1 illustrates an exemplary method for producing plastic containers and/or plastic preforms by means of an injection molding machine. The injection molding machine itself is not shown in FIG. 1.

For producing the plastic containers and/or plastic preforms on the one hand plastic recyclate and on the other hand new plastic material is used.

In the recycling method, recycled plastic material is initially shredded to flakes. These are then being cleaned and heated to a temperature of above 180° C. for decontamination/SSP.

The new plastic material usually first is provided at room temperature, i.e. at approximately 20° C. For drying and for inserting into the injection molding machine this new plastic material has to be heated. The heating of the new plastic material is performed by using at least a part of the heat contained in the heated plastic recyclate. In particular, the excess temperature of the plastic recyclate, which is achieved by the decontamination of the plastic recyclate, may be used for heating the new plastic material. This has further the advantage that the plastic recyclate is cooled in this way and, thus, the risk of thermal and hydrolytical damaging of the plastic recyclate is decreased.

In the example in FIG. 1 the heated plastic recyclate is first provided in a first container 1. The new plastic material is provided in a second container 2 which furthermore comprises a drying hopper 3. The first container 1 and the second container 1 are in this example designed as down tubes. In other words, the heated plastic recyclate is inserted into the first container at the top. In the lower part of the container 1 the heated plastic recyclate may be extracted and provided to an injection molding machine.

Analogously, new plastic material may be inserted into the container 2 from above. In the area of the drying hopper 3 it can be extracted and forwarded to the injection molding machine.

FIG. 1 further shows a dry air dryer 4, which first inputs dry air as heat transport means into the first container 1, where it is moved past the plastic recyclate directly in a counter flow. In this way, the dry air heats up. The heated dry air is then brought into the drying hopper 3 and moved upwards past the new plastic material. Thereby, the heated dry air can heat the new plastic material. The heat transport means is then redirected to the dry air dryer 4, whereby a dry air circuit is formed.

In this case, the dry air dryer can be designed such that it controls the inlet temperature of the drying hopper 3, in particular additionally provides the heat, which cannot be obtained from the plastic recyclate.

Alternatively or in addition to dry air, the heat transport means can comprise an inert gas, for example, Helium.

In the example shown in FIG. 1, the mass flow of the plastic recyclate and of the new plastic material can be formed unconnected. In other words, the plastic recyclate and the new plastic material can be forwarded separately to the injection molding machine.

The new plastic material can be heated to a temperature between 140 and 180° C. In this way, drying of the new plastic material can be achieved and the temperature can be adjusted for inserting into the injection molding machine.

By a device shown in FIG. 1, thus, heat from the recycling process can be used. By forming the recycling facility and the injection molding machine in a block, also a lower logistic effort can be achieved.

Figure 2:
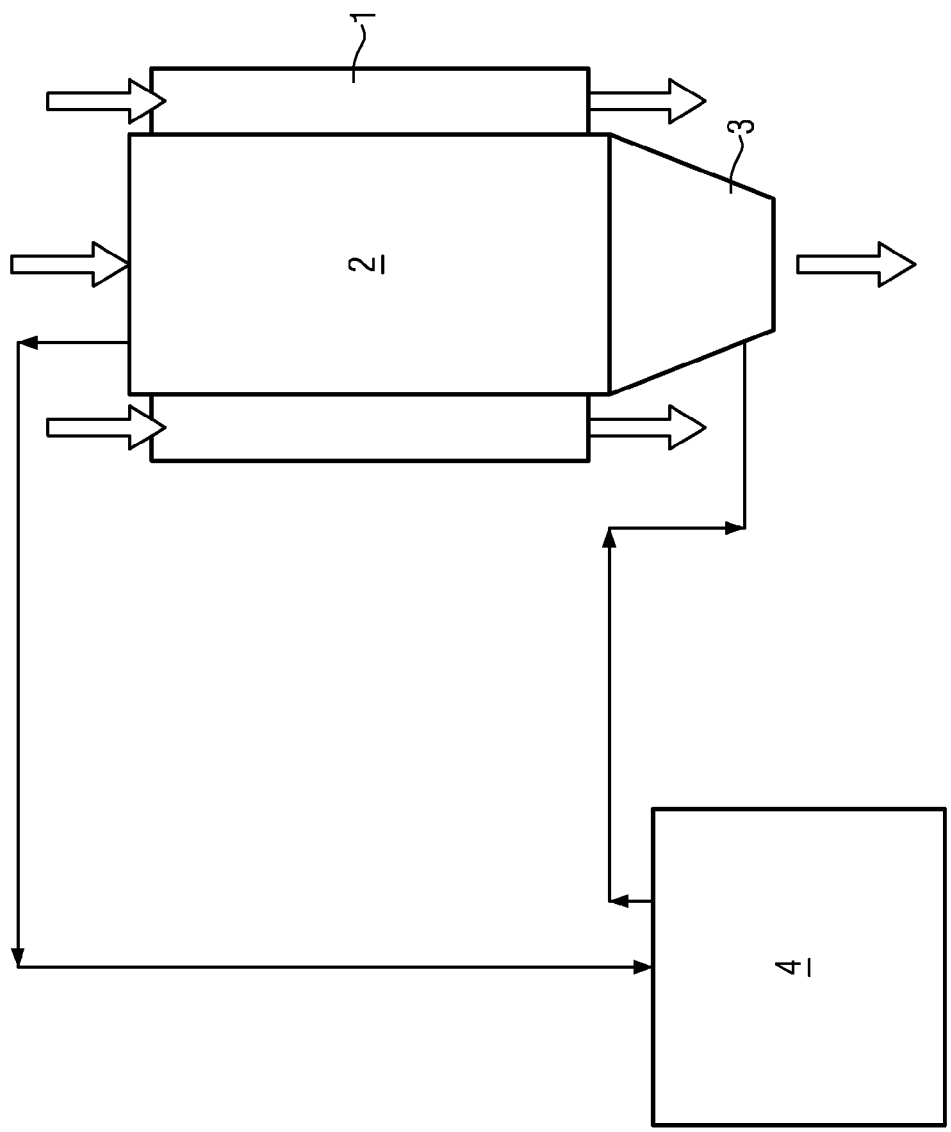
FIG. 2 an illustration of a further exemplary method for producing plastic containers and/or plastic preforms.

FIG. 2 illustrates a further exemplary method for producing plastic containers and/or plastic preforms. As in FIG. 1, a first container 1 for the plastic recyclate and a second container 2 for the new plastic material are provided. The second container 2 comprises a drying hopper 3.

In this example, the first container 1 and the second container 2 are arranged concentrically to each other, wherein the first container 1 at least partially surrounds the second container 2. The separation wall between the first container 1 and the second container 2 is in this case a heat permeable wall, i.e. comprises a heat conducting material, for example, stainless steel. The wall can in this case be approximately 2 to 3 mm thick. The heat conductivity of the material of the heat permeable wall can particularly be between 15 and 60 W/(K·m). However, it can also be conceived to form the heat permeable wall from copper, such that the heat conductivity can also be substantially higher with approximately 350 W/(m K).

FIG. 2 further shows a dry air dryer 4. This conducts dry air into the drying hopper 3, which is moved past the new plastic material and redirected to the dry air dryer 4. The dry air in this case serves for securing a good heat transport to the heat permeable wall.

It goes without saying that features mentioned in the embodiments described before are not restricted to these specific combinations and are also possible in arbitrary other combinations.

The invention claimed is:

1. Method for producing plastic containers and/or plastic preforms using an injection molding machine, comprising:
    providing plastic recyclate and new plastic material;
    heating the plastic recyclate; and
    heating the new plastic material using at least a part of the heat contained in the heated plastic recyclate,
    wherein the heating of the new plastic material comprises:
    moving a heat transport fluid past the heated plastic recyclate for heating the heat transport fluid; and
    moving the heated heat transport fluid past the new plastic material.

2. The method according to claim 1, wherein the plastic recyclate is heated to a temperature, which lies above the temperature required for inserting into and/or processing in the injection molding machine, and wherein at least a part of the heat above the temperature required for inserting into and/or processing in the injection molding machine is used for heating the new plastic material.

3. The method according to claim 1, wherein the plastic recyclate is heated such that the plastic recyclate is decontaminated at least partially via the heating.

4. The method according to claim 1, wherein the new plastic material is heated to a temperature between 140 ° C. and 180 ° C.

5. The method according to claim 4, wherein the temperature is 160° C.

6. The method according to claim 1, wherein the heat transport fluid comprises one of dry air, inert gas, or a combination thereof.

7. The method according to claim 1, wherein the heat transport fluid is moved past one of the heated plastic recyclate, the new plastic material directly, the new plastic material indirectly, and a combination thereof.

8. The method according to claim 1, wherein the heat transport fluid is moved past one of the heated plastic recyclate, the new plastic material, and a combination thereof in a counter flow.

9. Method for producing plastic containers and/or plastic preforms using an injection molding machine, comprising:
    providing plastic recyclate and new plastic material;
    heating the plastic recyclate; and heating the new plastic material using at least a part of the heat contained in the heated plastic recyclate,
wherein the heating of the new plastic material comprises an arranging of the heated plastic recyclate and the new plastic material in two containers, which are at least partially connected by a heat permeable wall.

10. The method according to claim 9, wherein the heat conductivity of the heat permeable wall is at least 15 W/(K·m).

11. The method according to claim 10, wherein the heat conductivity is at least 40 W/(K·m).

12. The method according to claim 9, wherein the container for the new plastic material is arranged at least partially inside the container for the heated plastic recyclate.

13. Device for producing plastic containers and/or plastic preforms, comprising:
an injection molding machine for injection molding one of the plastic containers, the plastic preforms, and a combination thereof;
a heating device for heating the plastic recyclate; and
a heating device for heating the new plastic material;
wherein the device is designed and/or configured such that at least a part of the heat contained in the heated plastic recyclate is used for heating the new plastic material,
the device further comprising a device for the transport of a heat transport fluid, which is designed such that the heat transport fluid is moved past the heated plastic recyclate for heating the heat transport fluid and that the heated heat transport fluid is moved past the new plastic material.

14. Device for producing plastic containers and/or plastic preforms, comprising:
an injection molding machine for injection molding one of the plastic containers, the plastic preforms, and a combination thereof;
a heating device for heating the plastic recyclate; and
a heating device for heating the new plastic material;
wherein the device is designed and/or configured such that at least a part of the heat contained in the heated plastic recyclate is used for heating the new plastic material,
the device further comprising a container for the heated plastic recyclate and a container for the new plastic material, wherein the respective containers are connected at least partially by a heat permeable wall.

15. The device according to claim 14, wherein the container for the new plastic material is arranged at least partially inside the container for the heated plastic recyclate.

* * * * *